No. 878,917. PATENTED FEB. 11, 1908.
R. H. WAPPLER.
ENDOSCOPE OR OTHER OPTICAL INSTRUMENT.
APPLICATION FILED MAY 13, 1907.
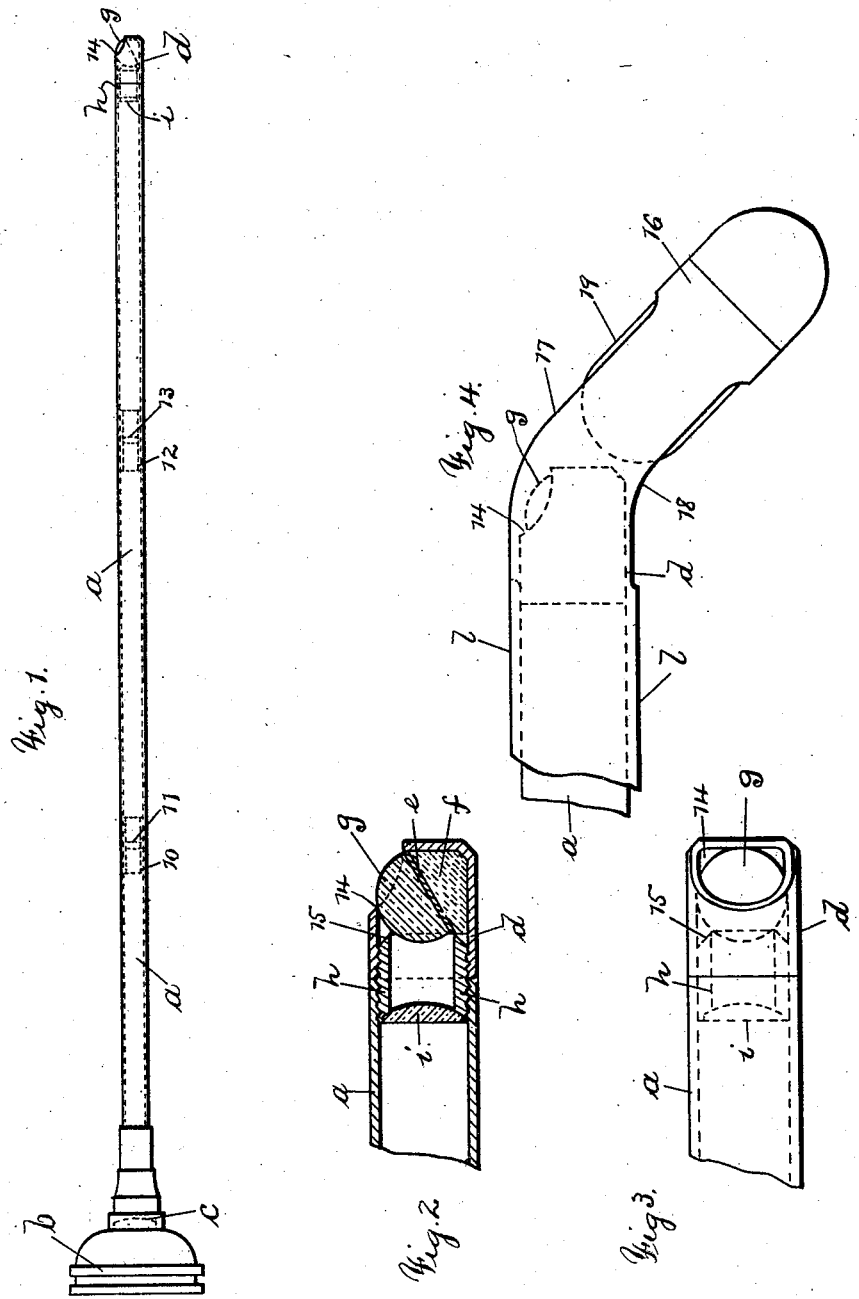

UNITED STATES PATENT OFFICE.

REINHOLD H. WAPPLER, OF NEW YORK, N. Y.

ENDOSCOPE OR OTHER OPTICAL INSTRUMENT.

No. 878,917.  Specification of Letters Patent.  Patented Feb. 11, 1908.

Application filed May 13, 1907. Serial No. 373,471.

*To all whom it may concern:*

Be it known that I, REINHOLD H. WAPPLER, a citizen of the United States, residing at the borough of Manhattan, city, county, and State of New York, have invented an Improvement in Endoscopes or other Optical Instruments, of which the following is a specification.

My invention relates to an improvement in endoscopes or other optical instrument particularly adapted for use in connection with cystoscopes, such for instance as shown and described in my co-pending application Serial No. 364,306, filed March 25, 1907, or other similar electro-surgical instruments employed in examination for and detection of diseases of a gastric or urinary nature, and my present invention is particularly an improvement upon the device shown and described in Letters Patent No. 795,567, granted to me July 25, 1905, for an improvement in endoscopes or other optical instruments, with the special object of so constructing the extremity of the telescopic tube and the setting of the lens therein as to obtain a more forward vision than so far as I am aware, has heretofore been obtained.

In carrying out my present invention, I prefer to employ a telescopic tube, fitted at one end with an eye-piece, together with the necessary lenses for magnifying and carrying the image, and provided at the other end with an end-piece fitted with a plano-convex lens set therein in such a position as to obtain a forward vision; the said end-piece being connected to the telescopic tube by a coupling member in which an objective glass is set, all of which will be hereinafter more particularly described.

In the drawing, Figure 1 is an elevation of my improved endoscope, Fig. 2 is a sectional elevation of the end of the same. Fig. 3 is a plan of the parts shown in Fig. 2 and Fig. 4 is an elevation of the end of a cystoscope showing the relative positions of the same and the end of the endoscope when placed therein for use.

Referring particularly to the drawing, $a$ designates a telescopic tube provided at one extremity with a head piece $b$ and an eye-piece $c$ and at the other extremity with an end-piece $d$.

Within the tube and in suitable positions therein between the eye-piece $c$ and the end-piece $d$, I may employ short tubes 10, 12, fitted respectively with the intermediate lenses 11 and 13, employed as will be understood, to magnify and carry the image. These short tubes 10 and 12 and their respective lenses 11 and 13 may be placed, as it will also be understood, in any required position within the telescopic tube $a$.

The end piece $d$ is provided at its extremity and in the portion of the cylindrical wall adjacent thereto with an opening 14.

$e$ represents a base or lens support set at an inclination within the end-piece $d$ upon a suitable foundation $f$ of resinous cement or other material and resting upon this support $e$ and fitted within the end-piece $d$ and extending partially through the opening 14, I employ a plano-convex lens $g$. As shown, this lens $g$ is set at such an acute inclination with the axis of the end-piece $d$, which is coincident with the axis of the telescopic tube, and being placed at the extremity of the end-piece and consequently of the telescopic tube, that the maximum forward vision may be obtained.

It is to be noted that the end-piece $d$ is of the same exterior and interior diameters as the telescopic tube $a$, and I prefer to employ a coupling member $h$ exteriorly screw-threaded and provided with a tapered end 15 adapted to screw into the screw-threaded interior of the end-piece $d$ in such a position that the tapered end 15 of the coupling member $h$ contacts with and bears against a portion of the plano-convex lens $g$, thereby maintaining the same in position upon the backing or support member $e$. At the other end thereof the coupling member $h$ is provided with an objective glass $i$ and this end of the coupling member is adapted to screw into the screw-threaded interior of the end of the telescopic tube $a$, whereby the end-piece $d$ is connected to the telescopic tube $a$.

Referring particularly to Fig. 4, $l$ represents a sheath of the cystoscope or other similar electro-surgical instrument, provided as set forth in my co-pending application, to which reference has hereinbefore been made, with an off-set end indicated at 16; this offset end being provided on opposite sides with cut-away portions 17 18 respectively, and fitted with a globe 19 adapted to receive an electric light bulb. In this figure the extremity of the endoscope is shown in dotted lines in position within the sheath $l$ of the cystoscope, wherein as will be apparent, the light from the electric light bulb will be thrown on the parts forward of the instrument and by means of the peculiar construction hereinbefore described of the extremity of the endoscope a vision of these parts may be obtained.

I claim as my invention:

1. An optical instrument comprising a tube, lenses therein, an end-piece, a lens set in the extremity of the said end-piece and means within the end-piece for securing the said lens in position and connecting the said end-piece to the extremity of the said telescopic tube.

2. An optical instrument comprising a tube, lenses therein, an end-piece, a lens set in the extremity of the said end-piece, means within the end-piece for securing the said lens in position and connecting the said end-piece to the extremity of the said telescopic tube and an objective glass set in the said means adjacent to the said lens.

3. An optical instrument comprising a tube, lenses therein, an end-piece provided with an opening in the extremity and the adjacent portion thereof, a lens support set at an acute angle to the longitudinal axis of the said end-piece, a plano-convex lens set on the said support and within the said opening at the extremity of the end piece and means within the said end-piece for connecting the same to the extremity of the said tube.

4. An optical instrument comprising a tube, lenses therein, an end-piece provided with an opening in the extremity and the adjacent portion thereof, a lens support set at an acute angle to the longitudinal axis of the said end-piece, a plano-convex lens set on the said support, means within the said end-piece for connecting the same to the extremity of the said tube and an objective glass set in the said means adjacent to the said lens.

5. An optical instrument comprising a tube, lenses therein, an end-piece provided with an opening in the extremity and adjacent portion thereof, a lens support set at an acute angle to the longitudinal axis of the said end-piece, a plano-convex lens set on the said support and extending into the said opening and a coupling fitting into the said end-piece and adapted to connect the same to the extremity of the said tube.

6. An optical instrument comprising a tube, lenses therein, an end-piece provided with an opening in the extremity and adjacent portion thereof, a lens support set at an acute angle to the longitudinal axis of the said end-piece, a plano-convex lens set on the said support and extending into the said opening and a coupling fitting into the said end-piece and having a conical end adapted to bear against a portion of the surface of the said lens, the said coupling being adapted to connect the said end-piece to the extremity of the said tube.

7. An optical instrument comprising a tube, lenses therein, an end-piece provided with an opening in the extremity and adjacent portion thereof, a lens support set at an acute angle to the longitudinal axis of the said end-piece, a plano-convex lens set on the said support and extending into the said opening and a coupling fitting into the said end-piece and having a conical end adapted to bear against a portion of the surface of the said lens, the said coupling being adapted to connect the said end-piece to the extremity of the said tube and an objective glass set in the said coupling.

Signed by me this 7th day of May, 1907.

REINHOLD H. WAPPLER.

Witnesses:
A. H. SERRELL,
BERTHA M. ALLEN.